United States Patent
Wan et al.

(10) Patent No.: US 10,511,494 B2
(45) Date of Patent: Dec. 17, 2019

(54) NETWORK CONTROL METHOD AND APPARATUS

(71) Applicant: Huawei Technologies Co., Ltd., Shenzhen (CN)

(72) Inventors: Hualin Wan, Shenzhen (CN); Xijun Xue, Beijing (CN); Tao Huang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 121 days.

(21) Appl. No.: 15/644,340

(22) Filed: Jul. 7, 2017

(65) Prior Publication Data

US 2017/0310561 A1 Oct. 26, 2017

Related U.S. Application Data

(63) Continuation of application No. PCT/CN2015/082222, filed on Jun. 24, 2015.

(30) Foreign Application Priority Data

Jan. 8, 2015 (CN) .......................... 2015 1 0008359

(51) Int. Cl.
*H04L 12/24* (2006.01)
*G06Q 20/06* (2012.01)
(Continued)

(52) U.S. Cl.
CPC ....... *H04L 41/5009* (2013.01); *G06Q 20/065* (2013.01); *H04L 63/20* (2013.01); *H04L 47/2433* (2013.01)

(58) Field of Classification Search
CPC ..... H04L 41/5009; H04L 12/14; H04L 63/20; H04L 47/2458; H04L 47/2433;
(Continued)

(56) References Cited

U.S. PATENT DOCUMENTS

| 8,244,886 B2* | 8/2012 | Short | H04L 63/08 |
| | | | 709/228 |
| 10,200,543 B2* | 2/2019 | Senarath | H04M 15/8016 |

(Continued)

FOREIGN PATENT DOCUMENTS

| CN | 1801748 A | 7/2006 |
| CN | 102055734 A | 5/2011 |

(Continued)

OTHER PUBLICATIONS

Machine Translation and Abstract of Chinese Publication No. CN1801748, Jul. 12, 2006, 8 pages.

(Continued)

*Primary Examiner* — David R Lazaro
*Assistant Examiner* — Berhanu Shitayewoldetadik
(74) *Attorney, Agent, or Firm* — Conley Rose, P.C.

(57) ABSTRACT

A network control method relates to the communications field, includes receiving, by a controller, a packet forwarded by a forwarder, detecting, by the controller, a status of a virtual currency identifier of the packet, querying, by the controller according to a user identifier in the packet, whether the user has permission to improve service quality when the status of the virtual currency identifier of the packet indicates that a user is willing to pay virtual currency to raise a network priority, and raising, by the controller, the network priority of the user, starting charging, and sending a network priority of the user to the forwarder when the user has the permission to improve the service quality such that the forwarder forwards a packet of the user according to the network priority of the user.

15 Claims, 7 Drawing Sheets

(51) Int. Cl.
*H04L 29/06* (2006.01)
*H04L 12/851* (2013.01)

(58) Field of Classification Search
CPC .... G06Q 20/29; G06Q 20/145; G06Q 20/065; H04W 4/24; H04M 15/57
USPC ........................................................ 709/223
See application file for complete search history.

(56) References Cited

U.S. PATENT DOCUMENTS

| | | | |
|---|---|---|---|
| 2001/0044845 A1* | 11/2001 | Cloonan | H04L 47/2408 709/226 |
| 2002/0133473 A1* | 9/2002 | Grande | G06Q 30/0284 705/418 |
| 2002/0147625 A1* | 10/2002 | Kolke, Jr. | G06Q 10/06311 705/7.13 |
| 2004/0235488 A1* | 11/2004 | Choi | H04L 47/24 455/452.2 |
| 2006/0178918 A1* | 8/2006 | Mikurak | G06Q 10/06 705/7.25 |
| 2007/0087756 A1* | 4/2007 | Hoffberg | G06Q 10/0631 455/450 |
| 2008/0263460 A1* | 10/2008 | Altberg | G06Q 30/02 715/757 |
| 2009/0100459 A1* | 4/2009 | Riedl | H04N 21/2385 725/35 |
| 2010/0235285 A1* | 9/2010 | Hoffberg | G06Q 20/401 705/75 |
| 2010/0317437 A1* | 12/2010 | Berry | G07F 17/3225 463/35 |
| 2011/0251868 A1* | 10/2011 | Mikurak | G06Q 10/06 705/7.25 |
| 2012/0089410 A1* | 4/2012 | Mikurak | G06Q 10/00 705/1.1 |
| 2012/0123924 A1* | 5/2012 | Rose | G06Q 20/12 705/35 |
| 2014/0052836 A1* | 2/2014 | Nguyen | H04L 45/306 709/223 |
| 2014/0089506 A1* | 3/2014 | Puttaswamy Naga | H04L 45/42 709/225 |
| 2014/0146674 A1* | 5/2014 | Wang | H04L 45/38 370/235 |
| 2014/0153787 A1* | 6/2014 | Schmidtler | G06K 9/00469 382/112 |
| 2014/0244661 A1* | 8/2014 | Peiris | H04L 67/10 707/748 |
| 2015/0088816 A1* | 3/2015 | Kruglick | H04L 47/38 707/610 |
| 2015/0264073 A1* | 9/2015 | Tavakoli | H04L 63/1425 726/23 |
| 2015/0326532 A1* | 11/2015 | Grant | H04L 63/0218 726/1 |
| 2016/0043941 A1* | 2/2016 | D'Heureuse | H04L 41/0896 370/390 |
| 2016/0043996 A1* | 2/2016 | Syed Mohamed | H04L 63/20 726/1 |
| 2016/0100417 A1* | 4/2016 | Mosko | H04W 72/10 370/329 |
| 2016/0308905 A1* | 10/2016 | Stiekes | H04L 47/20 |
| 2017/0034063 A1* | 2/2017 | Mozolewski | H04L 45/021 |
| 2017/0228705 A1* | 8/2017 | Sandor | G06Q 20/065 |

FOREIGN PATENT DOCUMENTS

| | | |
|---|---|---|
| CN | 103052046 A | 4/2013 |
| CN | 103716415 A | 4/2014 |
| CN | 104066125 A | 9/2014 |

OTHER PUBLICATIONS

Machine Translation and Abstract of Chinese Publication No. CN102055734, May 11, 2011, 14 pages.
Foreign Communication From a Counterpart Application, PCT Application No. PCT/CN2015/082222, English Translation of International Search Report dated Sep. 6, 2015, 2 pages.
Foreign Communication From a Counterpart Application, PCT Application No. PCT/CN2015/082222, English Translation of Written Opinion dated Sep. 6, 2015, 5 pages.
Machine Translation and Abstract of Chinese Publication No. CN103052046, Apr. 17, 2013, 22 pages.
Machine Translation and Abstract of Chinese Publication No. CN103716415, Apr. 9, 2014, 17 pages.
Machine Translation and Abstract of Chinese Publication No. CN104066125, Sep. 24, 2014, 26 pages.
Foreign Communication From a Counterpart Application, Chinese Application No. 201510008359.8, Chinese Office Action dated Sep. 10, 2019, 8 pages.

* cited by examiner

NETWORK CONTROL METHOD AND APPARATUS

CROSS-REFERENCE TO RELATED APPLICATIONS

This application is a continuation of International Patent Application No. PCT/CN2015/082222 filed on Jun. 24, 2015, which claims priority to Chinese Patent Application No. 201510008359.8 filed on Jan. 8, 2015. The disclosures of the aforementioned applications are hereby incorporated by reference in their entireties.

TECHNICAL FIELD

The present disclosure relates to the communications field, and in particular, to a network control method and an apparatus.

BACKGROUND

With development of the science and technology, the Internet has permeated aspects of work and life. Without the Internet, it becomes difficult to do anything. Essentially, the Internet is a medium for message exchange between people and between men and machines. The Internet needs to perform operations such as authentication and charging on a user before establishing a connection path for the user in order to allocate a proper network resource to an authenticated user and service according to an operation result. It can be learned from an existing network service control solution that wireless access is charged in a data plan manner. Although charging can be performed in real time, network service quality cannot be improved in real time according to a payment status. Service experience of all users deteriorates when a network environment becomes worse. It may be considered that a current network lacks flexibility.

In other approaches, in order to improve network flexibility and user experience, a priority of a packet is usually determined according to use frequency of a network service in order to ensure that a network service with relatively high use frequency has better network service quality.

It can be learned from the foregoing description that, in other approaches, network service quality can be improved according to use frequency of a network service, thereby improving network flexibility. However, a network demand of an application that has relatively low network service use frequency but has a high real-time quality requirement cannot be satisfied in the network control solution in other approaches.

SUMMARY

Embodiments of the present disclosure provide a network control method and an apparatus to improve network service quality in real time, and satisfy a network demand of an application that has low use frequency but has a high real-time quality requirement.

A first aspect of the embodiments of the present disclosure discloses a network control method, where the method is applied to software-defined networking (SDN), and includes receiving, by a controller, a packet forwarded by a forwarder, detecting, by the controller, a status of a virtual currency identifier of the packet, where the status of the virtual currency identifier is used to indicate whether a user is willing to pay virtual currency to raise a network priority, querying, by the controller according to a user identifier in the packet, whether the user has permission to improve service quality when the status of the virtual currency identifier of the packet indicates that the user is willing to pay virtual currency to raise the network priority, and raising, by the controller, the network priority of the user, starting charging, and sending a network priority of the user to the forwarder such that the forwarder forwards a packet of the user according to the network priority of the user when the user has the permission to improve the service quality.

With reference to the first aspect, in a first possible implementation of the first aspect of the present disclosure, querying, by the controller according to a user identifier in the packet, whether the user has permission to improve service quality includes sending, by the controller, the user identifier in the packet to a query system such that the query system queries, according to the user identifier, whether the user has the permission to improve the service quality, and receiving, by the controller, information fed back by the query system, and determining, according to the feedback information, whether the user has the permission to improve the service quality.

With reference to the first possible implementation of the first aspect, in a second possible implementation of the first aspect of the present disclosure, the feedback information further includes an account balance of the user, before raising, by the controller, the network priority of the user, starting charging, and sending a network priority of the user to the forwarder, the method further includes determining, by the controller, whether the account balance is greater than a preset value, and when the user has the permission to improve the service quality, raising by the controller, the network priority of the user, starting charging, and sending a network priority of the user to the forwarder includes raising, by the controller, the network priority of the user, starting charging, and sending the network priority of the user to the forwarder when the account balance is greater than the preset value and the user has the permission to improve the service quality.

With reference to the first aspect, the first possible implementation of the first aspect of the present disclosure, or the second possible implementation of the first aspect of the present disclosure, in a third possible implementation of the first aspect of the present disclosure, after raising, by the controller, the network priority of the user, starting charging, and sending a network priority of the user to the forwarder, the method further includes performing, by the controller, network service quality monitoring in order to obtain network service quality in real time.

With reference to the first aspect, the first possible implementation of the first aspect of the present disclosure, the second possible implementation of the first aspect of the present disclosure, or the third possible implementation of the first aspect, in a fourth possible implementation of the first aspect of the present disclosure, after raising, by the controller, the network priority of the user, starting charging, and sending a network priority of the user to the forwarder, the method further includes sending, by the controller, the network priority of the user to the user.

A second aspect of the embodiments of the present disclosure discloses a controller, and the controller includes a receiving unit configured to receive a packet forwarded by a forwarder, a detection unit configured to detect a status of a virtual currency identifier of the packet, where the status of the virtual currency identifier is used to indicate whether a user is willing to pay virtual currency to raise a network priority, a querying unit configured to query, according to a user identifier in the packet, whether the user has permission to improve service quality when the status of the virtual currency identifier of the packet indicates that the user is willing to pay virtual currency to raise the network priority, and a sending unit configured to raise the network priority of the user, start charging, and send a network priority of the user to the forwarder such that the forwarder forwards a packet of the user according to the network priority of the user when the user has the permission to improve the service quality.

With reference to the second aspect, in a first possible implementation of the second aspect, the querying unit includes a sending subunit and a querying subunit. The sending subunit is configured to send the user identifier in the packet to a query system such that the query system queries, according to the user identifier, whether the user has the permission to improve the service quality, and the querying subunit is configured to receive information fed back by the query system, and determine, according to the feedback information, whether the user has the permission to improve the service quality.

With reference to the first possible implementation of the second aspect, in a second possible implementation of the second aspect, the feedback information further includes an account balance of the user, and the controller further includes a determining unit. The determining unit is configured to determine whether the account balance is greater than a preset value, and the sending unit is configured to raise the network priority of the user, start charging, and send the network priority of the user to the forwarder such that the forwarder forwards the packet of the user according to the network priority of the user when the account balance is greater than the preset value and the user has the permission to improve the service quality.

With reference to the second aspect, the first possible implementation of the second aspect, or the second possible implementation of the second aspect, in a third possible implementation of the second aspect, the controller further includes a monitoring unit, and the monitoring unit is configured to perform network service quality monitoring in order to obtain network service quality in real time.

With reference to the second aspect, the first possible implementation of the second aspect, the second possible implementation of the second aspect, or the third possible implementation of the second aspect, in a fourth possible implementation of the second aspect, the sending unit is further configured to send the network priority of the user to the user.

It can be learned from the foregoing description that, according to the network control method and the controller provided in the embodiments of the present disclosure, the controller receives a packet forwarded by a forwarder. The controller detects a status of a virtual currency identifier of the packet, where the status of the virtual currency identifier is used to indicate whether a user is willing to pay virtual currency to raise a network priority. When the status of the virtual currency identifier of the packet indicates that the user is willing to pay virtual currency to raise the network priority, the controller queries, according to a user identifier in the packet, whether the user has permission to improve service quality. When the user has the permission to improve the service quality, the controller raises the network priority of the user, starts charging, and sends a network priority of the user to the forwarder such that the forwarder forwards a packet of the user according to the network priority of the user. In this way, a network priority of a user can be raised in real time according to a status of paying virtual currency by the user, a network demand of an application that has low use frequency but has a high real-time quality requirement is satisfied, and network flexibility is improved.

BRIEF DESCRIPTION OF DRAWINGS

In order to describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in embodiments of the present disclosure with reference to accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The Internet is a medium for information exchange between people and between men and machines. For different users and different services, the Internet should provide corresponding network resources to establish information connection paths. Therefore, network service control becomes an important function, that is, performing authentication, authentication, and charging on a user and a service, and allocating a proper network resource to an authenticated user and service. It can be learned from a currently existing network service control solution that a network is in an extensive management stage with a rigid charging manner and a homogeneous service during wireless access and wired access. Fixed-network access is usually charged in a manner of monthly payment or annual payment with no traffic limitation. Wireless access is charged in a data plan manner. Although charging can be performed in real time, network service quality cannot be improved in real time according to a payment status. When a network environment becomes worse, service experience of all users deteriorates. It may be considered that a current network is a rigid network lacking flexibility.

An SDN is a new network innovation architecture. The SDN includes a controller and a forwarder, and the SDN separates a control plane and a data plane using the controller and the forwarder in order to flexibly control network traffic and provide a good platform for network innovation and application innovation. The controller includes a management protocol, a routing protocol, and the like. The forwarder performs querying, forwarding, and caching for each data packet.

In other approaches, a network service priority is determined based on use frequency of a network service. Although demands of some applications can be satisfied, a demand of an application that has relatively low use frequency but has a high real-time quality requirement cannot be satisfied.

The present disclosure provides a technical solution. The technical solution is applied to SDN. In the technical solution, a network service with a higher priority is provided for a user who makes a payment using virtual currency in order to guarantee network service quality of the paying user. Therefore, a data transmission rate of an application that has relatively low use frequency but has a high real-time quality requirement is ensured.

Figure 1:
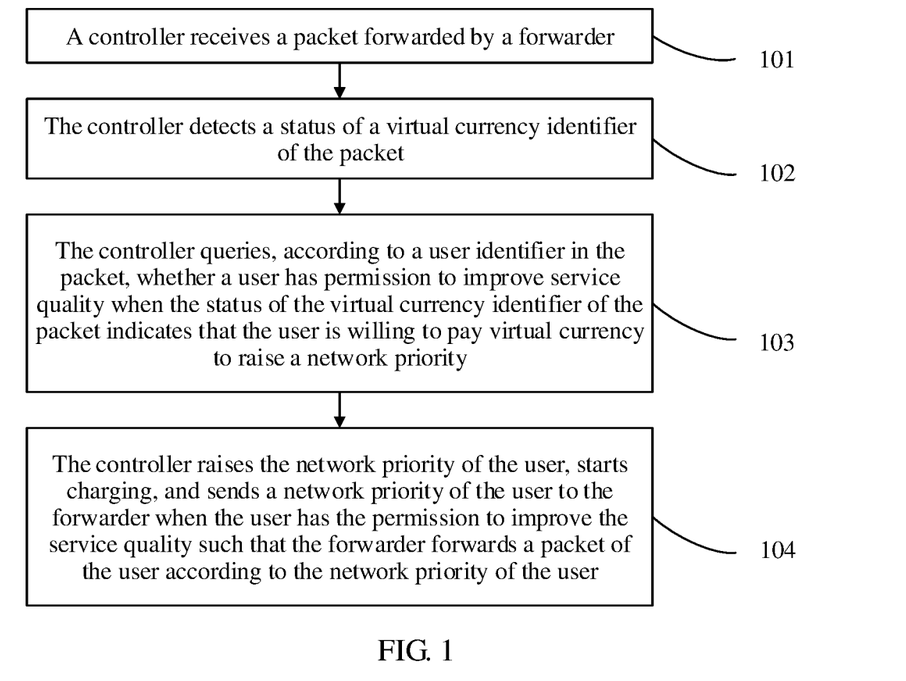
FIG. 1 is a flowchart of a network control method according to an embodiment of the present disclosure.

As shown in FIG. 1, FIG. 1 shows a network control method according to an embodiment of the present disclosure. The method is applicable to an SDN network architecture, and the method includes step 101 to step 104.

Step 101: A controller receives a packet forwarded by a forwarder.

In this embodiment of the present disclosure, after receiving a packet, the forwarder first checks a forwarding priority of the packet. If forwarding priority configuration information of the packet is found in a flow table, the packet is forwarded to another forwarder or a router according to the forwarding priority configuration, traffic statistics is performed, and a result of traffic statistics is reported. If forwarding priority configuration information of the packet is not found in a flow table, the packet is forwarded to the controller. The forwarder is a forwarder in an SDN network architecture, and the controller is a controller in the SDN network architecture.

Step 102: The controller detects a status of a virtual currency identifier of the packet, where the status of the virtual currency identifier is used to indicate whether a user is willing to pay virtual currency to raise a network priority.

In the packet, the status of the virtual currency identifier may be represented using a number in a field. For example, the virtual currency identifier includes two states, 1 and 0, and 1 and 0 respectively represent different states. For example, 1 indicates that the user is willing to pay virtual currency to raise the network priority, and 0 indicates that the user is unwilling to pay virtual currency to raise the network priority. Certainly, vice versa, 1 indicates that the user is unwilling to pay virtual currency to raise the network priority, and 0 indicates that the user is willing to pay virtual currency to raise the network priority.

In the packet, the status of the virtual currency identifier may be represented using multiple fields.

The user may perform recharging in cash or in another manner in order to obtain virtual currency.

Step 103: The controller queries, according to a user identifier in the packet, whether a user has permission to improve service quality when the status of the virtual currency identifier of the packet indicates that the user is willing to pay virtual currency to raise the network priority.

The controller parses the packet to obtain the user identifier from the packet, and then sends the user identifier to a query system when the status of the virtual currency identifier of the packet indicates that the user is willing to pay virtual currency to raise the network priority. The query system queries, according to the user identifier, whether the user has the permission to improve the service quality, and feeds a query result back to the controller. The user identifier may be an account registered by the user in the query system. The query system may be an Authentication, Authorization, Charging system, and the system is used for authentication, authorization, and charging.

When the status of the virtual currency identifier of the packet indicates that the user is willing to pay virtual currency to raise the network priority, the controller sends the packet to the query system. The query system obtains the user identifier from the packet, and then queries, according to the user identifier, whether the user has the permission to improve the service quality, and feeds a query result back to the controller.

Whether the user has the permission to improve the service quality is determined according to whether the user has registered. If the user has registered, the user has the permission to improve the service. After performing registration, the user also needs to recharge an account in cash or in another manner. More recharge indicates a higher permission. There are many classification manners, for example, a common user, a silver-card user, and a golden-card user. These are not listed herein one by one.

Step 104: The controller raises the network priority of the user, starts charging, and sends a network priority of the user to the forwarder when the user has the permission to improve the service quality such that the forwarder forwards a packet of the user according to the network priority of the user.

When the user has the permission to improve the service quality, the controller raises the network priority of the user, starts a charging function, and sends the raised network priority of the user to the forwarder such that the forwarder forwards the packet of the user according to the raised network priority.

It can be learned from the foregoing description that, according to the network control method provided in this embodiment of the present disclosure, a controller receives a packet forwarded by a forwarder. The controller detects a status of a virtual currency identifier of the packet, where the status of the virtual currency identifier is used to indicate whether a user is willing to pay virtual currency to raise a network priority. When the status of the virtual currency identifier of the packet indicates that the user is willing to pay virtual currency to raise the network priority, the controller queries, according to a user identifier in the packet, whether the user has permission to improve service quality. When the user has the permission to improve the service quality, the controller starts charging and sends a network priority of the user to the forwarder such that the forwarder forwards a packet of the user according to the network priority of the user. In this way, a network priority of a user can be raised in real time according to a status of paying virtual currency by the user, a network demand of an application that has low use frequency but has a high real-time quality requirement is satisfied, and network flexibility is improved.

Figure 2:
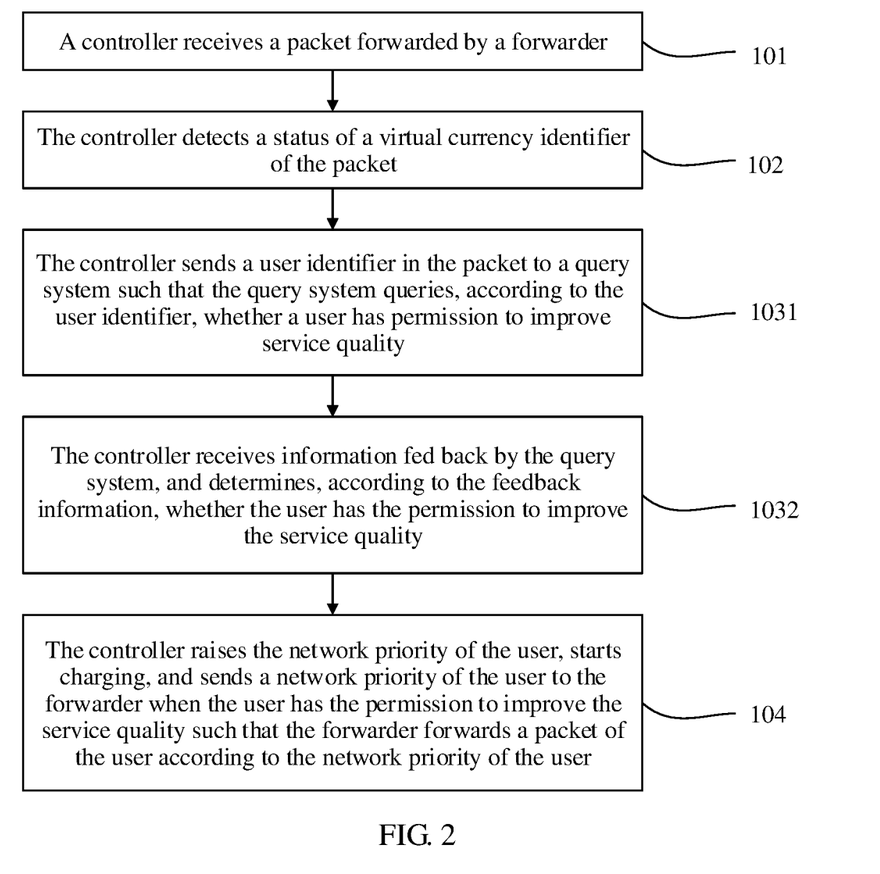
FIG. 2 is a flowchart of a network control method according to another embodiment of the present disclosure.

Optionally, based on the foregoing embodiment, as shown in FIG. 2, in another embodiment of the present disclosure, step 103 further includes step 1031 and step 1032.

Step 1031: The controller sends the user identifier in the packet to a query system such that the query system queries, according to the user identifier, whether the user has the permission to improve the service quality.

The user identifier may be a name or a serial number registered by the user in the query system, or may be a network address or a physical address.

The packet includes the user identifier. The controller may obtain the user identifier from the packet, and then send the user identifier to the query system. The query system may be a database that includes user data.

The controller may send the packet to the query system such that the query system obtains the user identifier from the packet, and then queries a balance of the user according to the user identifier.

Step 1032: The controller receives information fed back by the query system, and determines, according to the feedback information, whether the user has the permission to improve the service quality.

It can be learned from the foregoing description that, according to the network management method provided in this embodiment of the present disclosure, a controller sends a user identifier in a packet to a query system such that the query system queries, according to the user identifier, whether a user has permission to improve service quality. The controller receives information fed back by the query system, and determines, according to the feedback information, whether the user has the permission to improve the service quality. When the user has the permission to improve the service quality, the controller starts charging and sends a network priority of the user to a forwarder such that the forwarder forwards a packet of the user according to the network priority of the user. The controller queries, using the query system, the user's permission to improve the service quality in order to determine, according to whether the user has the permission to improve the service quality, whether to raise the network priority of the user. Therefore, a network service method is enriched, and network flexibility is improved.

Figure 3:
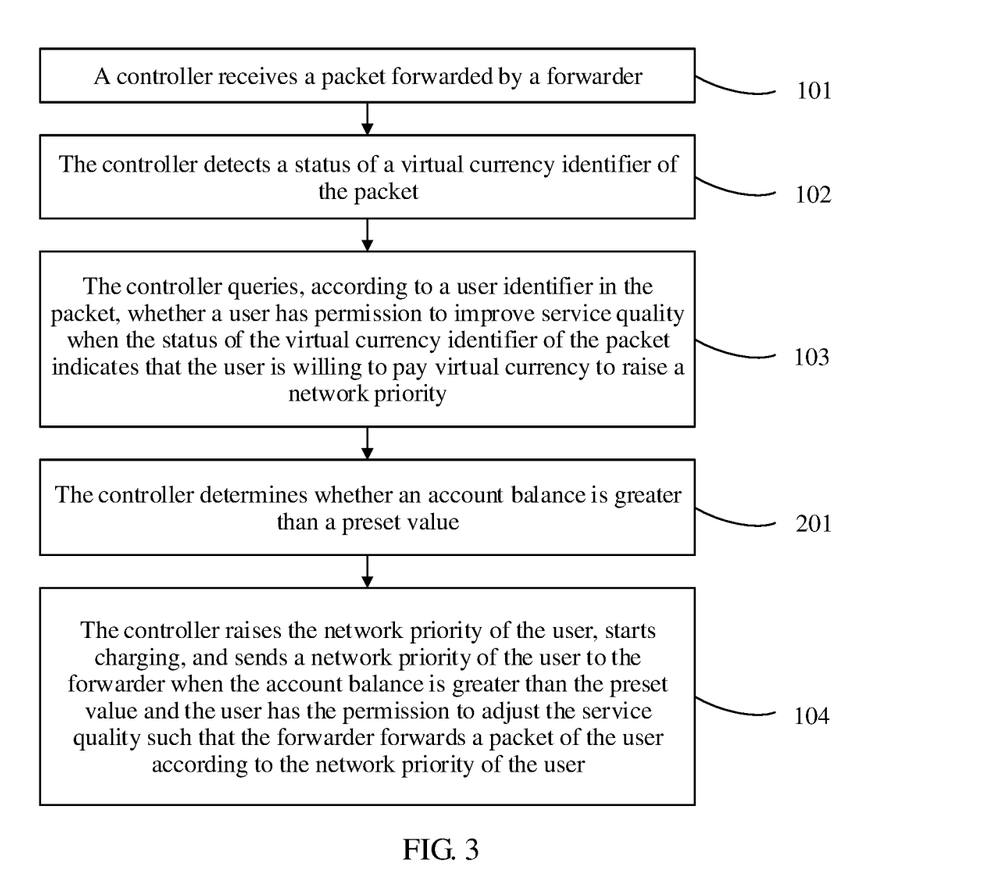
FIG. 3 is a flowchart of a network control method according to still another embodiment of the present disclosure.

Optionally, based on the foregoing embodiment, as shown in FIG. 3, in still another embodiment of the present disclosure, the feedback information received by the controller further includes an account balance of the user.

Before step 104, the method further includes step 201.

Step 201: The controller determines whether the account balance is greater than a preset value.

The query system may query information such as the permission and the account balance of the user according to the user identifier, and feed the permission and the account balance of the user back to the controller.

Step 104 further includes that the controller raises the network priority of the user, starts charging, and sends the network priority of the user to the forwarder when the account balance is greater than the preset value and the user has the permission to improve the service quality such that the forwarder forwards the packet of the user according to the network priority of the user.

After performing registration, the user has the permission to improve the service quality. However, the user needs to pay for the permission before using the permission to improve the service quality. The permission to improve the service quality can be used only when two conditions are satisfied. The user has the permission to improve the service quality and the account balance of the user is greater than the preset value. The preset value is greater than zero.

Figure 4:
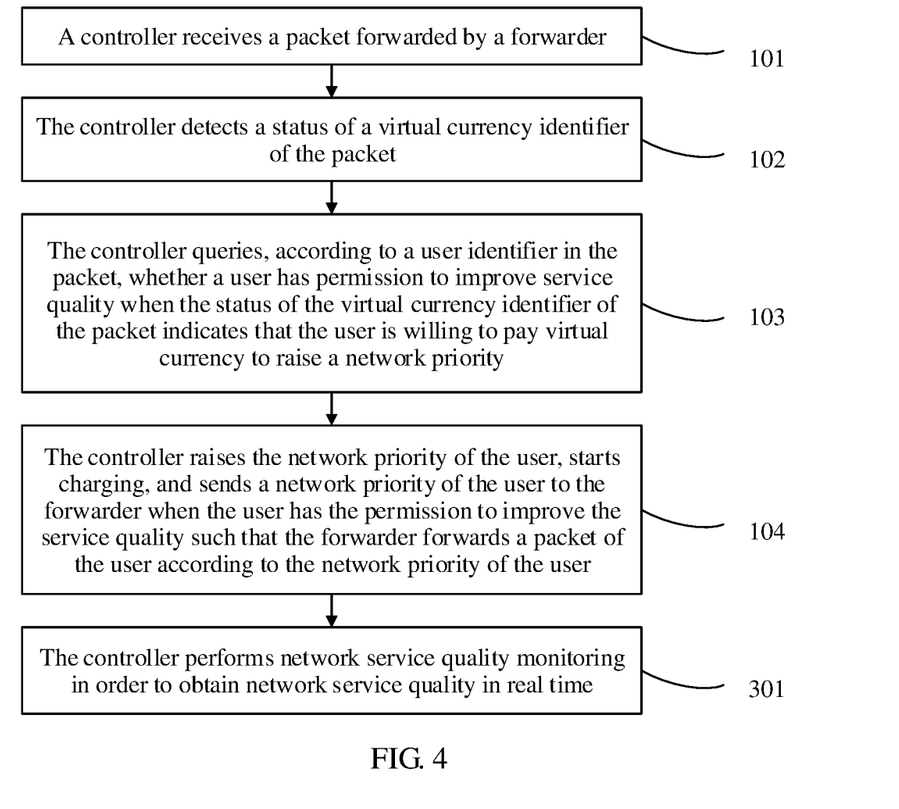
FIG. 4 is a flowchart of a network control method according to yet another embodiment of the present disclosure.

Optionally, based on the foregoing embodiment, as shown in FIG. 4, in yet another embodiment of the present disclosure, after step 104, the method further includes step 301.

Step 301: The controller performs network service quality monitoring in order to obtain network service quality in real time.

After the controller sends the network priority of the user to the forwarder, the controller starts network service quality monitoring in order to obtain the network service quality in real time.

Figure 5:
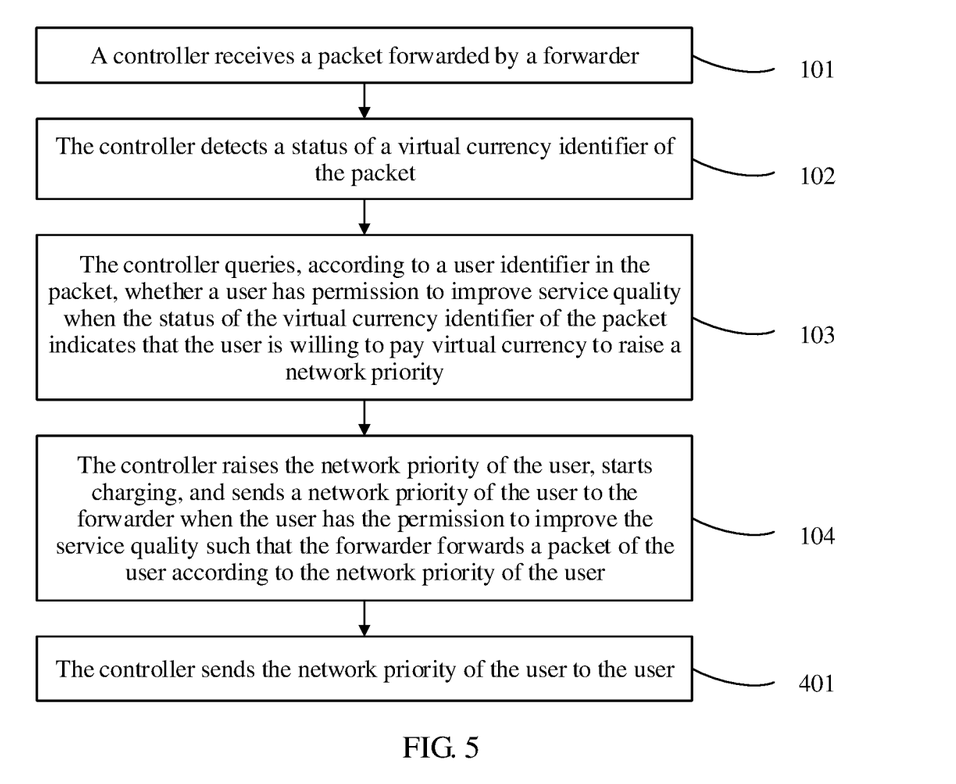
FIG. 5 is a flowchart of a network control method according to still yet another embodiment of the present disclosure.

Optionally, based on the foregoing embodiment, as shown in FIG. 5, in still yet another embodiment of the present disclosure, after step 104, the method further includes step 401.

Step 401: The controller sends the network priority of the user to the user.

After the controller sends the network priority of the user to the forwarder, the controller needs to make the user know the network priority of the user. Therefore, the controller may send an instruction to the forwarder such that the forwarder sends feedback information to the user. The feedback information includes the network priority of the user.

It can be learned from the foregoing description that, according to the network control method provided in this embodiment of the present disclosure, a controller starts charging and sends a network priority of a user to a forwarder such that the forwarder forwards a packet of the user according to the network priority of the user, and the controller sends the network priority of the user to the user. After sending the network priority of the user to the forwarder, the controller sends the network priority of the user to the user such that the user knows the network priority corresponding to permission of the user. Therefore, information transparency is improved.

Figure 6:
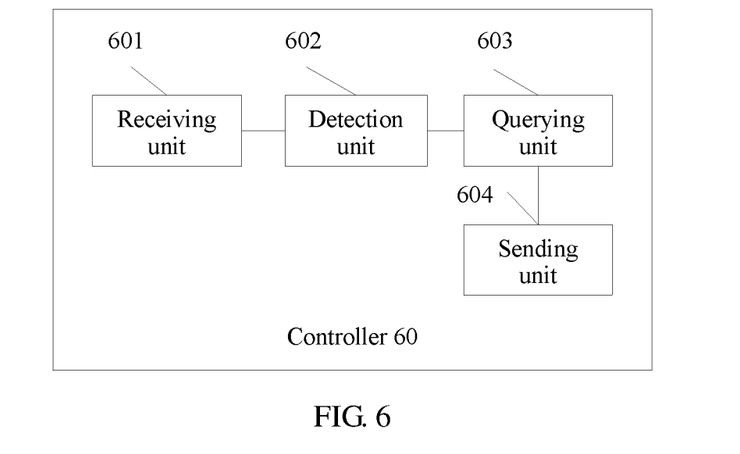
FIG. 6 is a structural diagram of a controller according to an embodiment of the present disclosure.

As shown in FIG. 6, FIG. 6 shows a controller 60 according to an embodiment of the present disclosure. The controller 60 is configured to perform the foregoing network control method shown in FIG. 1 to FIG. 5. The controller 60 includes a receiving unit 601, a detection unit 602, a querying unit 603, and a sending unit 604.

The receiving unit 601 is configured to receive a packet forwarded by a forwarder.

After receiving a packet, the forwarder searches for priority configuration information of the packet in a flow table. If the priority configuration information of the packet is not found, the packet is forwarded to the controller 60. The receiving unit 601 of the controller 60 receives the packet forwarded by the forwarder.

The detection unit 602 is configured to detect a status of a virtual currency identifier of the packet, where the status of the virtual currency identifier is used to indicate whether a user is willing to pay virtual currency to raise a network priority.

The status of the virtual currency identifier is identified using a field in the packet. For example, the detection unit 602 detects content of the field, and determines the status of the virtual currency identifier according to the content of the field.

The status of the virtual currency identifier may be represented using multiple fields in the packet. This is not limited herein.

The querying unit 603 is configured to query, according to a user identifier in the packet, whether the user has permission to improve service quality when the status of the virtual currency identifier of the packet indicates that the user is willing to pay virtual currency to raise the network priority.

The status of the virtual currency identifier includes a state that the user is willing to pay virtual currency and a state that the user is unwilling to pay virtual currency. For example, the status of the virtual currency identifier is represented using a field in the packet, where 1 represents the state that the user is willing to pay virtual currency, and 0 represents the state that the user is unwilling to pay virtual currency.

The status of the virtual currency identifier may be identified in multiple manners. This is not limited herein.

The sending unit 604 is configured to raise the network priority of the user, start charging, and send a network priority of the user to the forwarder when the user has the permission to improve the service quality such that the forwarder forwards a packet of the user according to the network priority of the user.

It can be learned from the foregoing description that, according to the controller 60 provided in this embodiment of the present disclosure, the controller 60 receives a packet forwarded by a forwarder. The controller 60 detects a status of a virtual currency identifier of the packet, where the status of the virtual currency identifier is used to indicate whether a user is willing to pay virtual currency to raise a network priority. When the status of the virtual currency identifier of the packet indicates that the user is willing to pay virtual currency to raise the network priority, the controller 60 queries, according to a user identifier in the packet, whether the user has permission to improve service quality. When the user has the permission to improve the service quality, the controller 60 raises the network priority of the user, starts charging, and sends a network priority of the user to the forwarder such that the forwarder forwards a packet of the user according to the network priority of the user. In this way, a network priority of a user can be raised in real time according to a status of paying virtual currency by the user, a network demand of an application that has low use frequency but has a high real-time quality requirement is satisfied, and network flexibility is improved.

Figure 7:
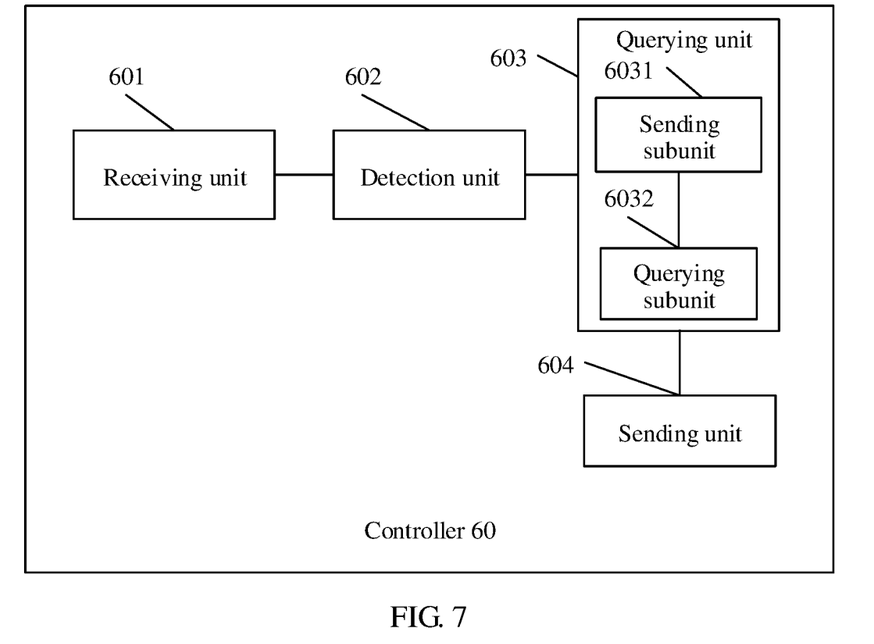
FIG. 7 is a structural diagram of a controller according to another embodiment of the present disclosure.

Optionally, based on the foregoing controller 60 shown in FIG. 6, as shown in FIG. 7, in another embodiment of the present disclosure, the querying unit 603 includes a sending subunit 6031 and a querying subunit 6032.

The sending subunit 6031 is configured to send the user identifier in the packet to a query system such that the query system queries, according to the user identifier, whether the user has the permission to improve the service quality.

The querying subunit 6032 is configured to receive information fed back by the query system, and determine, according to the feedback information, whether the user has the permission to improve the service quality.

Figure 8:
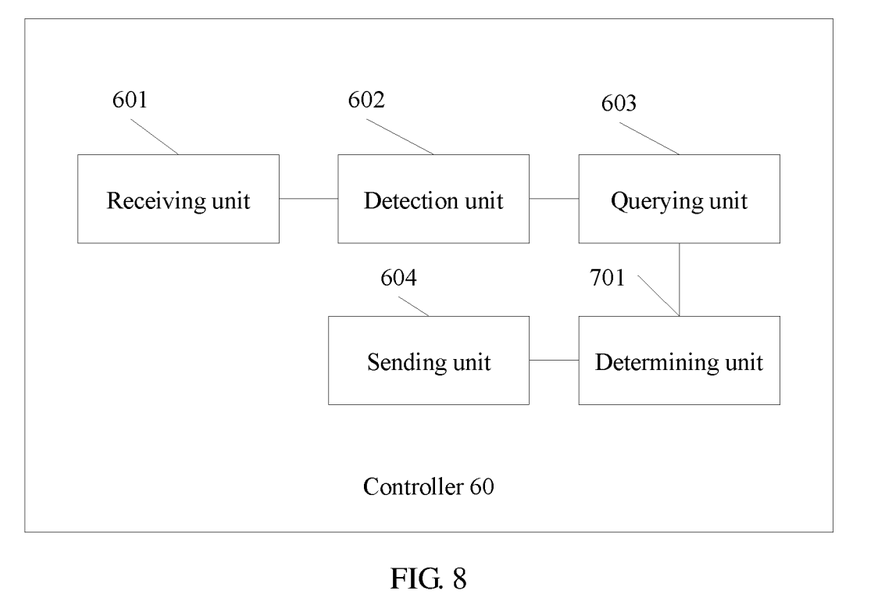
FIG. 8 is a structural diagram of a controller according to still another embodiment of the present disclosure.

Optionally, based on the foregoing apparatus, as shown in FIG. 8, in still another embodiment of the present disclosure, the feedback information further includes an account balance of the user, and the controller 60 further includes a determining unit 701.

The determining unit 701 is configured to determine whether the account balance is greater than a preset value.

The sending unit 604 is configured to raise the network priority of the user, start charging, and send, to the forwarder, the network priority of the user determined by the determining unit 701 when the account balance is greater than the preset value and the user has the permission to improve the service quality such that the forwarder forwards the packet of the user according to the network priority of the user.

Figure 9:
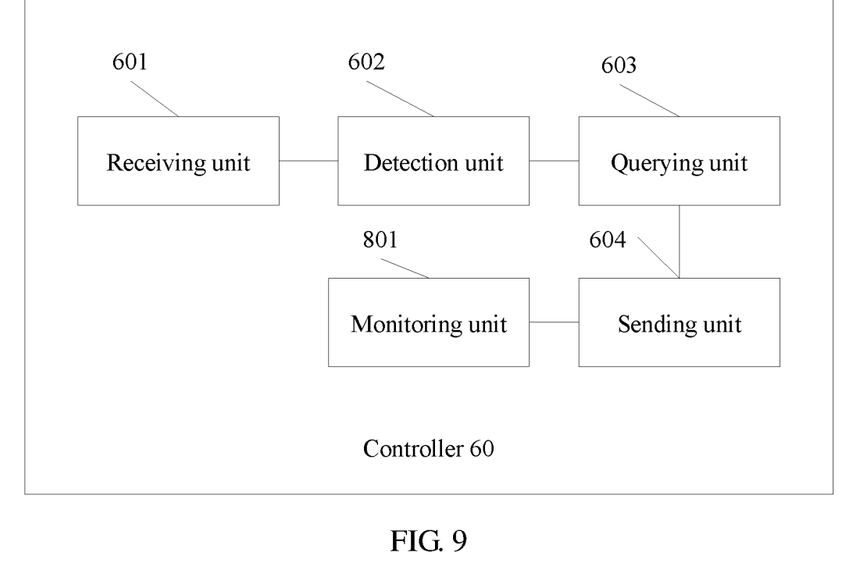
FIG. 9 is a structural diagram of a controller according to yet another embodiment of the present disclosure.

Optionally, based on the foregoing controller 60 shown in FIG. 6, as shown in FIG. 9, the controller 60 further includes a monitoring unit 801.

The monitoring unit 801 is configured to perform network service quality monitoring in order to obtain network service quality in real time.

Optionally, the sending unit 604 is further configured to send the network priority of the user to the user.

It can be learned from the foregoing description that, according to the controller 60 provided in this embodiment of the present disclosure, the controller 60 raises a network priority of a user, starts charging, and sends a network priority of the user to a forwarder such that the forwarder forwards a packet of the user according to the network priority of the user, and the controller 60 sends the network priority of the user to the user. After sending the network priority of the user to the forwarder, the controller 60 sends the network priority of the user to the user such that the user knows the network priority corresponding to permission of the user. Therefore, information transparency is improved.

Figure 10:
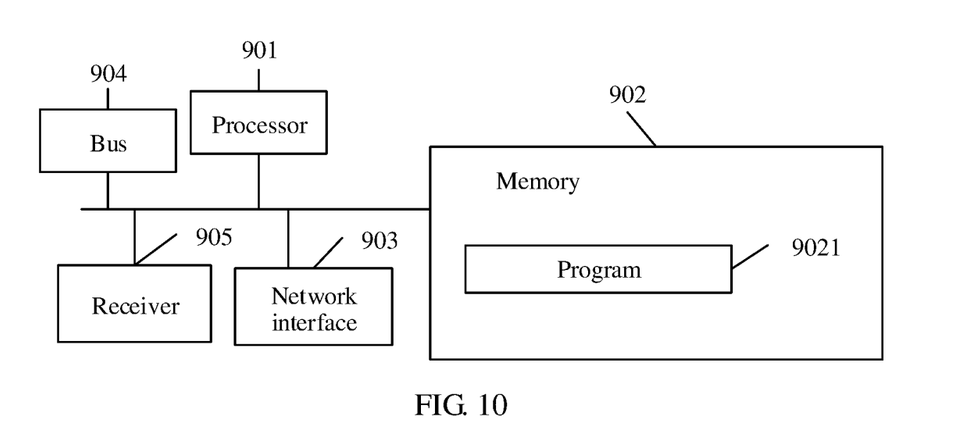
FIG. 10 is a structural diagram of a controller according to still yet another embodiment of the present disclosure.

FIG. 10 shows a structure of a controller according to still yet embodiment of the present disclosure. The controller includes at least one processor 901 (for example, a central processing unit (CPU)), a memory 902, at least one network interface 903, at least one communications bus 904 that is configured to implement connection and communication between the apparatuses, and at least one receiver 905. The processor 901 is configured to execute an executable module such as a computer program stored in the memory 902. The memory 902 may include a high-speed random access memory (RAM), or may include a nonvolatile memory. When a communication connection between the network device and at least one another network element is implemented using the at least one network interface 903 (which may be wired or wireless), the Internet, a wide area network, a local area network, a metropolitan area network and the like may be used. The controller is configured to perform the network control method shown in any one of FIG. 1 to FIG. 5.

In some implementations, the memory 902 stores a program 9021. The program 9021 may be executed by the processor 901, and the program includes receiving a packet forwarded by a forwarder, detecting a status of a virtual currency identifier of the packet, where the status of the virtual currency identifier is used to indicate whether a user is willing to pay virtual currency to raise a network priority, querying, according to a user identifier in the packet, whether the user has permission to improve service quality when the status of the virtual currency identifier of the packet indicates that the user is willing to pay virtual currency to raise the network priority, and raising the network priority of the user, starting charging, and sending a network priority of the user to the forwarder when the user has the permission to improve the service quality such that the forwarder forwards a packet of the user according to the network priority of the user.

Specific implementation steps are the same as those in the embodiment shown in FIG. 1. Details are not described herein.

Optionally, querying, according to a user identifier in the packet, whether the user has permission to improve service quality includes sending the user identifier in the packet to a query system such that the query system queries, according to the user identifier, whether the user has the permission to improve the service quality, and receiving information fed back by the query system, and determining, according to the feedback information, whether the user has the permission to improve the service quality.

Optionally, the feedback information further includes an account balance of the user, before raising the network priority of the user, starting charging, and sending a network priority of the user to the forwarder, the program further includes determining whether the account balance is greater than a preset value, and raising, by the controller, the network priority of the user, starting charging, and sending a network priority of the user to the forwarder when the user has the permission to improve the service quality includes raising, by the controller, the network priority of the user, starting charging, and sending the network priority of the user to the forwarder when the account balance is greater than the preset value and the user has the permission to improve the service quality.

Optionally, after raising the network priority of the user, starting charging, and sending a network priority of the user to the forwarder, the program further includes performing network service quality monitoring in order to obtain network service quality in real time.

Optionally, after raising the network priority of the user, starting charging, and sending a network priority of the user to the forwarder, the program further includes sending the network priority of the user to the user.

It can be learned from the foregoing description that, according to the network control method and the controller provided in the embodiments of the present disclosure, the controller receives a packet forwarded by a forwarder. The controller detects a status of a virtual currency identifier of the packet, where the status of the virtual currency identifier is used to indicate whether a user is willing to pay virtual currency to raise a network priority. When the status of the virtual currency identifier of the packet indicates that the user is willing to pay virtual currency to raise the network priority, the controller queries, according to a user identifier in the packet, whether the user has permission to improve service quality. When the user has the permission to improve the service quality, the controller raises the network priority of the user, starts charging, and sends a network priority of the user to the forwarder such that the forwarder forwards a packet of the user according to the network priority of the user. In this way, a network priority of a user can be raised in real time according to a status of paying virtual currency by the user, a network demand of an application that has low use frequency but has a high real-time quality requirement is satisfied, and network flexibility is improved.

It should be noted that in order to make the description brief, the foregoing method embodiments are expressed as a series of actions. However, a person skilled in the art should appreciate that the present disclosure is not limited to the described action sequence, because according to the present disclosure, some steps may be performed in another sequence or performed simultaneously. In addition, a person skilled in the art should also appreciate that all the embodiments described in the specification are preferred embodiments, and the related actions and modules are not necessarily mandatory to the present disclosure.

Content such as information exchange and an execution process between the modules in the apparatus and the system is based on a same idea as the method embodiments of the present disclosure. Therefore, for detailed content, reference may be made to descriptions in the method embodiments of the present disclosure. Details are not described herein.

A person of ordinary skill in the art may understand that all or some of the processes of the methods in the embodiments may be implemented by a computer program instructing relevant hardware. The program may be stored in a computer readable storage medium. When the program runs, the processes of the foregoing method embodiments may be included. The foregoing storage medium may be a magnetic disk, an optical disc, a read-only memory (ROM), a RAM, or the like.

Specific examples are used in this specification to describe the principle and implementations of the present disclosure. The descriptions of the foregoing embodiments are merely intended to help understand the method and idea of the present disclosure. In addition, with respect to the implementations and the application scope, modifications may be made by a person of ordinary skill in the art according to the idea of the present disclosure. Therefore, this specification shall not be construed as a limitation on the present disclosure.

What is claimed is:

1. A network control method applied to a software-defined networking, comprising:
    receiving, by a controller, a packet from a forwarder, wherein the packet comprises a user identifier and a virtual currency identifier;
    detecting, by the controller, a status of the virtual currency identifier, wherein the status of the virtual currency identifier indicates whether a user is willing to pay virtual currency to raise a network priority, and wherein the network priority corresponds to a forwarding priority of the packet through the forwarder;
    querying, by the controller according to the user identifier, whether the user has permission to improve service quality based on the status of the virtual currency identifier of the packet indicating the user is willing to pay the virtual currency to raise the network priority;
    raising, by the controller, the network priority of the user based on the querying;
    starting charging by the controller; and
    sending, by the controller, the network priority of the user to the forwarder based on the user having the permission to improve the service quality.

2. The method of claim 1, wherein querying whether the user has permission to improve the service quality comprises:
    sending, by the controller, the user identifier to a query system;
    receiving, by the controller, feedback information from the query system that indicates whether the user has the permission to improve the service quality; and
    determining, by the controller, whether the user has the permission to improve the service quality based on the information from the query system.

3. The method of claim 2, wherein the feedback information further comprises an account balance of the user, wherein before raising the network priority of the user, starting charging, and sending the network priority of the user to the forwarder, the method further comprises determining, by the controller, whether the account balance is greater than a preset value, and wherein raising the network priority of the user, starting charging, and sending the network priority of the user to the forwarder comprises each of raising, by the controller, the network priority of the user, starting charging, and sending the network priority of the user to the forwarder when the account balance is greater than the preset value and the user has the permission to improve the service quality.

4. The method of claim 1, wherein after raising the network priority of the user, starting charging, and sending the network priority of the user to the forwarder, the method further comprises performing, by the controller, network service quality monitoring to obtain network service quality in real time.

5. The method of claim 1, wherein after raising the network priority of the user, starting charging, and sending the network priority of the user to the forwarder, the method further comprises sending, by the controller, the network priority of the user to the user.

6. A controller, comprising:
a receiver configured to receive a packet from a forwarder, wherein the packet comprises a user identifier and a virtual currency identifier;
a processor coupled to the receiver and configured to:
detect a status of the virtual currency identifier, wherein the status of the virtual currency identifier indicates whether a user is willing to pay virtual currency to raise a network priority, and wherein the network priority corresponds to a forwarding priority of the packet through the forwarder;
query, according to the user identifier, whether the user has permission to improve service quality when the status of the virtual currency identifier of the packet indicates the user is willing to pay the virtual currency to raise the network priority; and
a transmitter coupled to the receiver and the processor and configured to:
raise the network priority of the user based on the query;
start charging; and
send the network priority of the user to the forwarder when the user has the permission to improve the service quality.

7. The controller of claim 6, wherein the processor is further configured to:
send the user identifier to a query system to permit the query system to query, according to the user identifier, whether the user has the permission to improve the service quality;
receive feedback information from the query system; and
determine, according to the feedback information, whether the user has the permission to improve the service quality.

8. The controller of claim 7, wherein the feedback information further comprises an account balance of the user, wherein the processor is further configured to determine whether the account balance is greater than a preset value, and wherein the transmitter is further configured to raise the network priority of the user, start charging, and send the network priority of the user to the forwarder when the account balance is greater than the preset value and the user has the permission to improve the service quality.

9. The controller of claim 6, wherein the processor is further configured to perform network service quality monitoring to obtain network service quality in real time.

10. The controller of claim 6, wherein the transmitter is further configured to send the network priority to the user.

11. A non-transitory computer readable storage medium storing program code thereon for network control associated with a computing device in software-defined networking, wherein the program code comprising instructions when executed on a processor, the non-transitory computer readable medium causes the processor to:
receive a packet from a forwarder, wherein the packet comprises a user identifier and a virtual currency identifier;
detect a status of the virtual currency identifier, wherein the status of the virtual currency identifier indicates whether a user is willing to pay virtual currency to raise a network priority, and wherein the network priority corresponds to a forwarding priority of the packet through the forwarder;
query, according to the user identifier in the packet, whether the user has permission to improve service quality when the status of the virtual currency identifier of the packet indicates that the user is willing to pay the virtual currency to raise the network priority; and
raise the network priority of the user based on the query, start charging, and send the network priority of the user to the forwarder when the user has the permission to improve the service quality to permit the forwarder forwards a packet of the user according to the network priority of the user.

12. The non-transitory computer readable storage medium of claim 11, wherein the instructions to query whether the user has the permission to improve the service quality comprises instructions to cause the processor to:
send the user identifier in the packet to a query system to permit the query system to query, according to the user identifier, whether the user has the permission to improve the service quality;
receive feedback information from the query system; and
determine, by the controller according to the feedback information, whether the user has the permission to improve the service quality.

13. The non-transitory computer readable storage medium of claim 12, wherein the feedback information further comprises an account balance of the user, wherein before raising the network priority of the user, starting charging, and sending the network priority of the user to the forwarder, the instructions further cause the processor to determine whether the account balance is greater than a preset value, and wherein raising the instructions to raise the network priority of the user, start charging, and send the network priority of the user to the forwarder comprises instructions to cause the processor to raise the network priority of the user, start charging, and send the network priority of the user to the forwarder when the account balance is greater than the preset value and the user has the permission to improve the service quality.

14. The non-transitory computer readable storage medium of claim 11, wherein after raising the network priority of the user, starting charging, and sending the network priority of the user to the forwarder, the instructions further cause the processor to perform network service quality monitoring to obtain network service quality in real time.

15. The non-transitory computer readable storage medium of claim 11, wherein after raising the network priority of the user, starting charging, and sending the network priority of the user to the forwarder, the instructions further cause the processor to send the network priority of the user to the user.

* * * * *